(12) United States Patent
Ni

(10) Patent No.: US 10,730,619 B2
(45) Date of Patent: Aug. 4, 2020

(54) ARM AND UNMANNED AERIAL VEHICLE

(71) Applicant: AUTEL ROBOTICS CO., LTD., Shenzhen, Guangdong (CN)

(72) Inventor: Feng Ni, Guangdong (CN)

(73) Assignee: AUTEL ROBOTICS CO., LTD., Shenzhen, Guangdon (CN)

( * ) Notice: Subject to any disclaimer, the term of this patent is extended or adjusted under 35 U.S.C. 154(b) by 329 days.

(21) Appl. No.: 15/848,910

(22) Filed: Dec. 20, 2017

(65) Prior Publication Data

US 2018/0312254 A1 Nov. 1, 2018

Related U.S. Application Data

(63) Continuation of application No. PCT/CN2017/106917, filed on Oct. 19, 2017.

(30) Foreign Application Priority Data

Apr. 26, 2017 (CN) .................... 2017 2 0454856 U

(51) Int. Cl.
 *B64C 39/02* (2006.01)
 *B64C 1/06* (2006.01)
 *B64C 1/30* (2006.01)

(52) U.S. Cl.
 CPC ............ *B64C 39/024* (2013.01); *B64C 1/063* (2013.01); *B64C 1/30* (2013.01);
 (Continued)

(58) Field of Classification Search
 CPC ..... B64C 1/063; B64C 1/30; B64C 2201/024; B64C 2201/027; B64C 2201/042;
 (Continued)

(56) References Cited

U.S. PATENT DOCUMENTS 5,220,773 A * 6/1993 Klaeger ............... A01D 34/866
 56/10.4
9,738,380 B2 * 8/2017 Claridge ................ G05D 1/101
 (Continued)

FOREIGN PATENT DOCUMENTS

CN 104853988 A 8/2015
CN 205239891 U 5/2016
 (Continued)

OTHER PUBLICATIONS

International Search Report dated Feb. 1, 2018; PCT/CN2017/106917.
 (Continued)

*Primary Examiner* — Medhat Badawi

(57) ABSTRACT

The present invention relates to the field of air vehicle technologies and provides an arm, a power assembly and an unmanned aerial vehicle. The arm includes a principal arm and an auxiliary arm. The principal arm is mounted on the vehicle body and the principal arm can rotate relative to the vehicle body. One end of the auxiliary arm is connected to the principal arm. The auxiliary arm can rotate relative to the principal arm. In the foregoing manner, an unmanned aerial vehicle having the arm is compact in structure, small in volume and easy to carry after being folded.

10 Claims, 3 Drawing Sheets

(52) U.S. Cl.
CPC .. *B64C 2201/024* (2013.01); *B64C 2201/027* (2013.01); *B64C 2201/042* (2013.01); *B64C 2201/088* (2013.01); *B64C 2201/108* (2013.01); *B64C 2201/20* (2013.01); *B64C 2201/201* (2013.01); *B64C 2201/203* (2013.01)

(58) Field of Classification Search
CPC ........ B64C 2201/088; B64C 2201/108; B64C 2201/20; B64C 2201/201; B64C 2201/203; B64C 39/024
See application file for complete search history.

(56) References Cited

U.S. PATENT DOCUMENTS

| | | | | |
|---|---|---|---|---|
| 9,984,672 | B2* | 5/2018 | Fong | H04R 3/04 |
| 10,538,316 | B2* | 1/2020 | Chen | B64C 39/024 |
| 10,538,318 | B2* | 1/2020 | von Flotow | B64C 39/024 |
| 2009/0196587 | A1* | 8/2009 | Cheung | A61L 9/037 |
| | | | | 392/394 |
| 2012/0138732 | A1* | 6/2012 | Olm | B64C 39/024 |
| | | | | 244/17.23 |
| 2012/0261523 | A1 | 10/2012 | Shaw | |
| 2013/0190697 | A1* | 7/2013 | Raab | A61M 5/24 |
| | | | | 604/232 |
| 2015/0321755 | A1 | 11/2015 | Martin et al. | |
| 2016/0052626 | A1 | 2/2016 | Vander Mey | |
| 2017/0043870 | A1* | 2/2017 | Wu | B64C 39/024 |
| 2017/0144741 | A1* | 5/2017 | Wang | B64C 39/028 |
| 2018/0312254 | A1* | 11/2018 | Ni | B64C 39/024 |
| 2018/0327092 | A1* | 11/2018 | Deng | B64C 25/52 |
| 2018/0354620 | A1* | 12/2018 | Baek | B64C 39/024 |
| 2018/0354622 | A1* | 12/2018 | Raffler | B64C 39/024 |
| 2019/0077503 | A1* | 3/2019 | Reddy | B64C 39/024 |
| 2019/0144115 | A1* | 5/2019 | Chen | B64C 25/32 |
| 2019/0248464 | A1* | 8/2019 | Ye | B64C 39/024 |

FOREIGN PATENT DOCUMENTS

| | | |
|---|---|---|
| CN | 105711812 A | 6/2016 |
| CN | 106005413 A | 10/2016 |
| CN | 205770109 U | 12/2016 |
| CN | 205837170 U | 12/2016 |
| CN | 106379514 A | 2/2017 |
| CN | 106394885 A | 2/2017 |
| WO | 2016/192021 A1 | 12/2016 |

OTHER PUBLICATIONS

Extended European Search Report dated Feb. 25, 2019; Appln. No. 17814292.3.

* cited by examiner

ARM AND UNMANNED AERIAL VEHICLE

CROSS REFERENCE

The present application claims priority to Chinese Patent Application No. 201720454856.5, filed on Apr. 27, 2017 and entitled "ARM, POWER ASSEMBLY AND UNMANNED AERIAL VEHICLE", which is incorporated herein by reference in its entirety.

TECHNICAL FIELD

The present invention relates to the field of unmanned aerial vehicle technologies, and in particular, to an arm, a power assembly having the arm and an unmanned aerial vehicle having the power assembly.

RELATED ART

An unmanned aerial vehicle (UAV) is a new-concept equipment that is in rapidly developing. It has advantages of flexible maneuver, quick response, unmanned piloting and having low operation requirements. Provided with multiple types of sensors or camera devices, the unmanned aerial vehicle can implement functions of real-time transmission of images and detection in high-risk regions, and is a powerful supplement to satellite remote sensing and traditional airborne remote sensing. Currently, the use range of the unmanned aerial vehicle has extended to three major fields of military affairs, scientific research and civil affairs. Specifically, the unmanned aerial vehicle is used widely in fields such as electric power communication, meteorology, agriculture, oceans, exploration, photography, disaster prevention and reduction, crop yield estimation, anti-narcotics and anti-smuggling, border patrolling, public security and counter-terrorism.

During implementation of the present invention, the inventor finds that the prior art has at least the following problem: Current rotor unmanned aerial vehicles are universally not easy to carry. Although some small consumer unmanned aerial vehicles can be folded and accommodated in particular space, folding structures of large professional unmanned aerial vehicles are still not compact enough. Many unmanned aerial vehicles are folded only by simply bending rotor arms and the size of the unmanned aerial vehicle is not reduced in all dimensions of length, width and height.

SUMMARY

To resolve the foregoing technical problem, embodiments of the present invention provide a foldable arm that is compact in structure, a power assembly having the arm and an unmanned aerial vehicle having the power assembly.

To resolve the foregoing technical problem, the embodiments of the present invention provide the following technical solution:

An arm, applied to an unmanned aerial vehicle, where the unmanned aerial vehicle includes a vehicle body and the arm includes:

a principal arm, where the principal arm is mounted on the vehicle body and the principal arm can rotate relative to the vehicle body; and an auxiliary arm, where one end of the auxiliary arm is connected to the principal arm and the auxiliary arm can rotate relative to the principal arm.

In some embodiments, the other end of the auxiliary arm is used for mounting a driving apparatus.

In some embodiments, a limiting structure and an elastic part are disposed at a joint between the principal arm and the vehicle body.

In some embodiments, a limiting structure and an elastic part are disposed at a joint between the principal arm and the auxiliary arm.

In some embodiments, a spring lock is disposed at a joint between the principal arm and the auxiliary arm.

In some embodiments, a spring lock is disposed at a joint between the principal arm and the vehicle body.

In some embodiments, the arm includes one principal arm and four auxiliary arms, a mounting part used for connecting the principal arm to the vehicle body being disposed at the middle of the principal arm.

In some embodiments, the mounting part can rotate relative to the vehicle body.

In some embodiments, connectors are disposed at both ends of the principal arm respectively and each connector is hingedly connected to two auxiliary arms respectively.

In some embodiments, connectors are disposed at both ends of the principal arm respectively and each connector is detachably connected to two auxiliary arms respectively.

In some embodiments, the connectors are three-way fittings, two ends of each connector being respectively connected to two respective ends of two auxiliary arms and the other end of each connector being connected to the principal arm.

In some embodiments, the lengths of the four auxiliary arms are equal and a sum of the lengths of two auxiliary arms is less than or equal to the length of the principal arm.

In some embodiments, the lengths of the four auxiliary arms are not equal; two of the auxiliary arms are located on one side of the principal arm and the other two of the auxiliary arms are located on the other side of the principal arm; and a sum of the lengths of two auxiliary arms located on a same side is less than or equal to the length of the principal arm.

In some embodiments, when the arm is unfolded, two auxiliary arms located on a same side are located on a same straight line and are perpendicular to the principal arm.

In some embodiments, when the arm is unfolded, there is an obtuse angle between the principal arm and two auxiliary arms located on a same side.

In some embodiments, the number of the arms is two and each arm includes one principal arm, two auxiliary arms and one connector, two respective ends of the two principal arms being respectively mounted on two opposite sides of the vehicle body, the principal arms being capable of rotating relative to the vehicle body and the other end of the principal arm being hingedly connected to the connector.

In some embodiments, the two auxiliary arms are respectively connected to two ends of the connector; and when the arm is folded, the principal arm comes into contact with the vehicle body, one auxiliary arm overlaps the other auxiliary arm after rotating by 180 degrees and the two auxiliary arms overlap the principal arm.

In some embodiments, for two auxiliary arms located on a same side, one end of one auxiliary arm is hingedly connected to the connector and one end of the other auxiliary arm is fixedly connected to the connector.

In some embodiments, when the arm is unfolded, two auxiliary arms located on a same side are located on a same straight line and are perpendicular to the principal arm.

To resolve the foregoing technical problem, the embodiments of the present invention further provide the following technical solution:

A power assembly includes the foregoing arm; a driving apparatus, where the driving apparatus is mounted on the auxiliary arm; and a propeller, where the propeller is mounted on the driving apparatus, to be driven by the driving apparatus to generate a lift force or a propulsive force.

To resolve the foregoing technical problem, the embodiments of the present invention further provide the following technical solution:

An unmanned aerial vehicle includes a vehicle body; the foregoing arm; a driving apparatus, where the driving apparatus is mounted on the auxiliary arm; and a propeller, where the propeller is mounted on the driving apparatus, to be driven by the driving apparatus to generate a lift force or a propulsive force.

Compared with the prior art, the arm in the embodiments of the present invention includes the principal arm and the auxiliary arm. The principal arm is mounted on the vehicle body and the principal arm can rotate relative to the vehicle body. One end of the auxiliary arm is connected to the principal arm and the auxiliary arm can rotate relative to the principal arm to implement folding. By means of this structure design, an unmanned aerial vehicle having the arm has advantages of being compact in structure, small in volume and easy to carry after being folded.

BRIEF DESCRIPTION OF THE DRAWINGS

One or more embodiments are exemplarily described by using figures that are corresponding thereto in the accompanying drawings. The exemplary descriptions do not constitute a limitation on the embodiments. Elements with a same reference numeral in the accompanying drawings represent similar elements. Unless otherwise particularly stated, the figures in the accompanying drawings constitute no proportion limitation.

DETAILED DESCRIPTION

For ease of understanding the present invention, the present invention is described in further detail below with reference to the accompanying drawings and specific embodiments. It should be noted that when an element is described as being "fixed" on another element, the element may be directly on the another element, or one or more intermediate elements may exist therebetween. When an element is described as being "connected" to another element, the element may be directly connected to another element, or one or more intermediate elements may exist therebetween. Directions and location relationships indicated by terms such as "upper", "lower", "inner", "outer" and "bottom" used in this specification are based on directions and location relationships shown in the accompanying drawings and are merely for ease of describing the present invention and simplifying descriptions rather than indicating or suggesting that a directed apparatus or element must have a specific direction and be constructed and operated in a specific direction, and therefore cannot be understood as a limitation on the present invention. In addition, terms such as "first", "second" and "third" are merely used for the purpose of description and cannot be understood as indicating or suggesting relative importance.

Unless otherwise defined, meanings of all technical and scientific terms used in this specification are the same as that usually understood by persons skilled in the technical field to which the present invention belongs. The terms used in this specification of the present invention are merely intended to describe specific implementations rather than limit the present invention. A term "and/or" used in this specification includes any or all combinations of one or more related listed items.

In addition, in the following descriptions, technical features provided in the different embodiments of the present invention may be mutually combined provided that the technical features do not conflict with each other.

Figure 1:
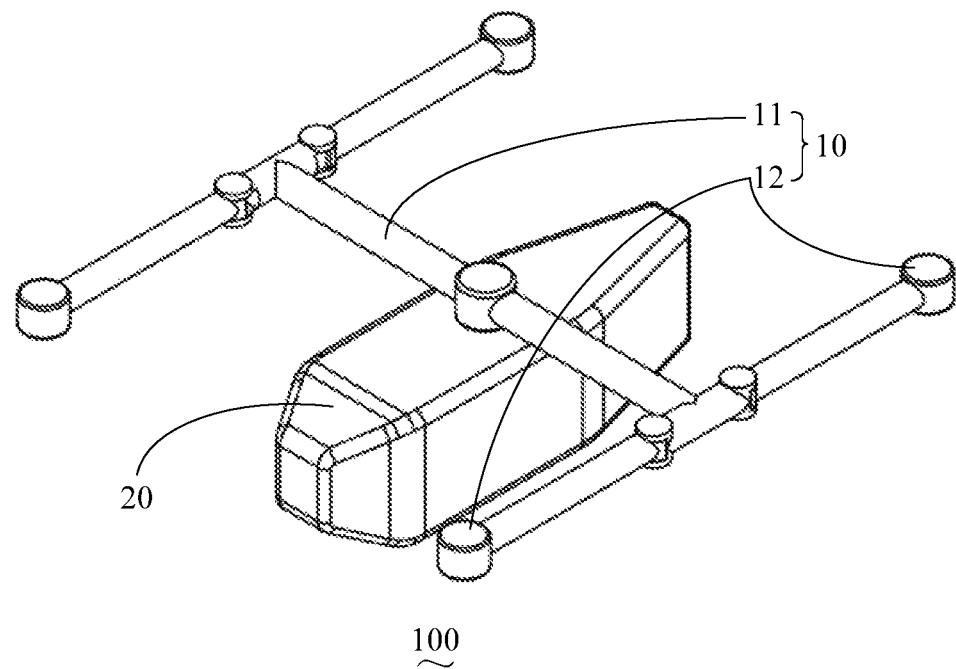
FIG. 1 is a simplified schematic structural stereogram of an unmanned aerial vehicle according to an embodiment of the present invention, where an arm of the unmanned aerial vehicle is in an unfolded state.
Figure 2:
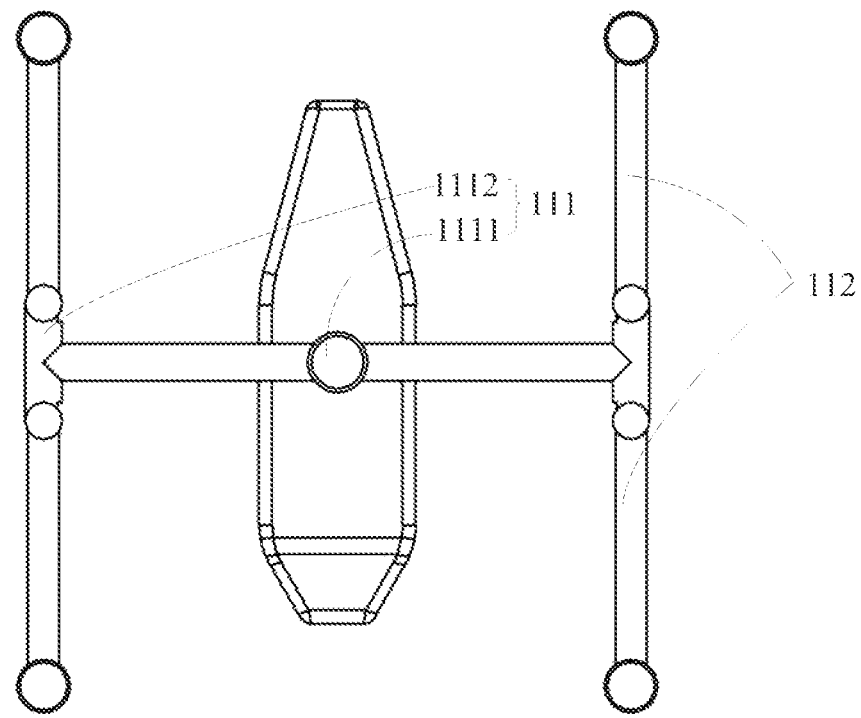
FIG. 2 is a schematic structural top view of the unmanned aerial vehicle shown in FIG. 1.
Figure 3:
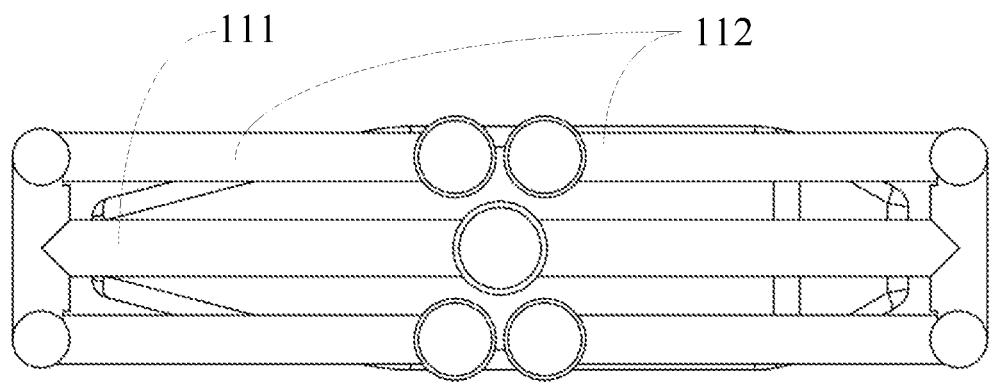
FIG. 3 is a schematic structural top view of the unmanned aerial vehicle according to the embodiment of the present invention, where the arm of the unmanned aerial vehicle is in a folded state.

Referring to FIG. 1 to FIG. 3, this embodiment of the present invention provides an unmanned aerial vehicle 100, including a power assembly 10 and a vehicle body 20. The power assembly 10 is mounted on the vehicle body 20 and configured to provide power for the unmanned aerial vehicle 100 and drive the unmanned aerial vehicle 100 to fly. The power assembly 10 may be further used for a flying toy and the like.

The vehicle body 20 includes a control circuit assembly including an electronic component such as an MCU. The control circuit assembly includes multiple control modules, such as a flight control module used for controlling a flight attitude of the unmanned aerial vehicle, a BeiDou module used for navigation of the unmanned aerial vehicle and a data processing module used for processing environment information obtained by a related airborne device.

The power assembly 10 includes an arm 11, a driving apparatus 12 and a propeller (not shown). The arm 11 includes a principal arm 111 and an auxiliary arm 112. The principal arm 111 is mounted on the vehicle body 20 and the principal arm 111 can rotate relative to the vehicle body 20. One end of the auxiliary arm 112 is connected to the principal arm 111 and the other end is used for mounting the driving apparatus 12. The driving apparatus 12 is configured to drive the propeller to rotate. It may be understood that, in another embodiment, the other end of the auxiliary arm 112 is not necessarily used for mounting the driving apparatus 12. For example, the driving apparatus 12 may be alternatively mounted at another location on the arm 11. This is no strictly limited herein.

In this embodiment, the power assembly 10 includes one arm 11, four driving apparatuses 12 and four propellers. The arm 11 includes one principal arm 111 and four auxiliary arms 112. A mounting part 1111 is disposed at the middle of the principal arm 111 and is used for connecting to the vehicle body 20. The principal arm 111 is mounted above the vehicle body 20. Specifically, the mounting part (1111) can rotate relative to the vehicle body (20), to enable the principal arm (111, 111a) to rotate relative to the vehicle body (20, 20a).

It may be understood that, in another embodiment, the number of the principal arms 111 is not limited to one and may be adaptively adjusted. For example, there may be two principal arms 111. The mounting part 1111 may be further used as a connector. By using the mounting part 1111, two principal arms 111 are connected and mounted on the vehicle body 20.

A connector 1112 is disposed at each of two ends of the principal arm III. Two ends of each connector 1112 are respectively hingedly connected to two respective ends of two auxiliary arms 112. The other end of each auxiliary arm 112 is fixedly connected to one driving apparatus 12 and the auxiliary arm 112 can rotate relative to the principal arm 111 to implement folding. A limiting structure and an elastic part are disposed at a joint between the principal arm 111 and the vehicle body 20 and the elastic part can improve the operational convenience and the hand feel. A limiting structure and an elastic part are disposed at a joint between the principal arm 111 and the auxiliary arm 112. In some other embodiments, a structure such as a spring lock may be used for locking. In another embodiment, two ends of each connector 1112 may be further respectively detachably connected to two respective ends of two auxiliary arms 112, to detach the auxiliary arm 112.

It may be understood that, in some other embodiments, a spring lock is disposed at a joint between the principal arm 111 and the vehicle body 20, to replace the limiting structure and the elastic part.

It may be understood that, in some other embodiments, the connector 1112 is a three-way fitting, two ends of each connector 1112 being respectively hingedly connected to two respective ends of two auxiliary arms 112 and the other end of each connector 1112 being connected to the principal arm 111.

It may be understood that, in some other embodiments, the connector 1112 may be omitted and one end of the auxiliary arm 112 is directly hingedly connected to the principal arm 111.

The driving apparatus 12 includes a motor. The four propellers are respectively mounted on the four driving apparatuses 12. The lengths of the four auxiliary arms 112 are equal and a sum of the lengths of two auxiliary arms 112 is less than or equal to the length of the principal arm 111. Cross-sectional shapes of the principal arm 111 and the auxiliary arms 112 are round.

It may be understood that, in some other embodiments, the lengths of the four auxiliary arms 112 may be not equal, provided that a sum of the lengths of two auxiliary arms 112 located on a same side is less than or equal to the length of the principal arm 111.

It may be understood that, in some other embodiments, cross-sectional shapes of the principal arm 111 and the auxiliary arms 112 are not limited to being round and may be set according to an actual requirement to, for example, squares, triangles or other irregular shapes.

It may be understood that, in some other embodiments, in addition to a location above the vehicle body 20, a mounting location of the principal arm 111 may be further set according to an actual requirement to, for example, a location below the vehicle body 20.

During flight, the arm 11 is in an unfolded state and the principal arm 111 is perpendicular to a heading direction of the unmanned aerial vehicle 100. Two auxiliary arms 112 are located on one side of the vehicle body 20 and the other two auxiliary arms 112 are located on the other side of the vehicle body 20. Two auxiliary arms 112 located on a same side are located on a same straight line and are perpendicular to the principal arm 111. It may be understood that, in some other embodiments, two auxiliary arms 112 located on a same side may be further set according to an actual requirement. For example, two auxiliary arms 112 located on a same side form a first included angle. The first included angle may be an obtuse angle or an acute angle. The auxiliary arms 112 and the principal arm 111 form a second included angle. The second included angle may be an obtuse angle or an acute angle (that is, when the arm 11 is unfolded, the two auxiliary arms 112 located on the same side may be slightly splayed outwards and form an obtuse angle or an acute angle with the principal arm 111).

After the flight ends, the auxiliary arm 112 can rotate relative to the principal arm 111 to implement folding. Therefore, first, the auxiliary arms 112 are rotated, so that the four auxiliary arms 112 are all parallel to the principal arm 111. In this case, after being folded, the power assembly 10 becomes very compact in structure and forms a rectangular frame. Then, the principal arm 111 and the four auxiliary arms 112 are rotated by 90 degrees relative to the vehicle body 20, so that after being folded, the entire unmanned aerial vehicle 100 becomes very compact in structure and easy to carry. In addition, the unmanned aerial vehicle 100 can be effectively prevented from being damaged due to a collision when carried.

After being folded, the power assembly 10 has a shape and a size corresponding to those of the vehicle body 20. In this embodiment, the power assembly 10 has a rectangular shape after being folded and the vehicle body 20 also has a rectangular shape.

It may be understood that, the shape of the vehicle body 20 may be designed to be round, oval, or the like according to an actual requirement. Correspondingly, after being folded, the power assembly 10 has a round or an oval shape.

In some other embodiments, the number of the auxiliary arms 112, the number of the driving apparatuses 12 and the number of the propellers are not limited to four, and may be designed according to an actual requirement to, for example, two, three or more than four.

Figure 4:
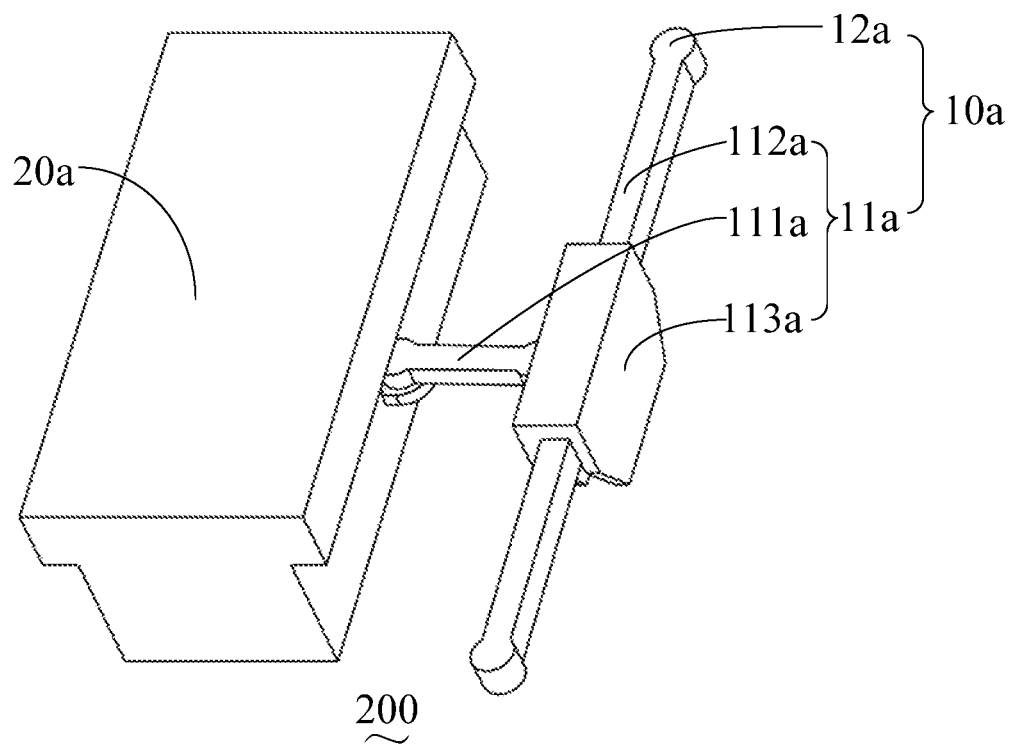
FIG. 4 is a schematic structural stereogram of an unmanned aerial vehicle according to another embodiment of the present invention, where an arm of the unmanned aerial vehicle is in an unfolded state.
Figure 5:
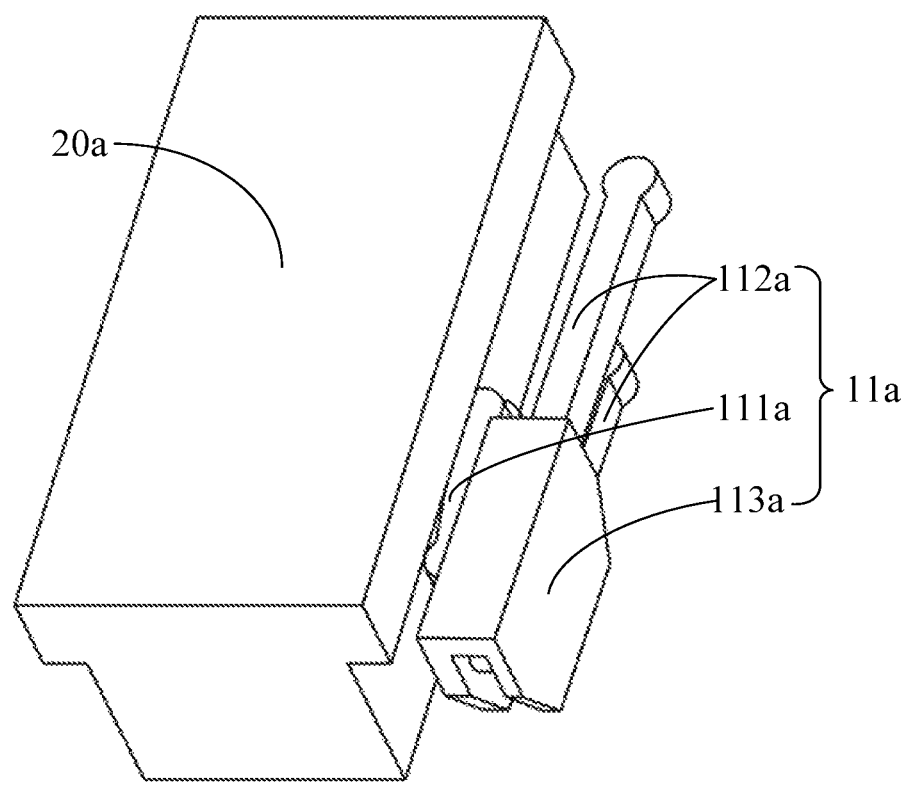
FIG. 5 is a schematic structural stereogram of the unmanned aerial vehicle according to the embodiment of the present invention, where the arm of the unmanned aerial vehicle is in a folded state.

Referring to FIG. 4 and FIG. 5, in this embodiment, an unmanned aerial vehicle 200 includes a power assembly 10a and a vehicle body 20a. The vehicle body 20a may be basically the same as the vehicle body 20 in above described embodiment in structure function. Details are not described herein again.

The power assembly 10a includes two arms 11a, four driving apparatuses 12a and four propellers. The arm 11a includes one principal arm 111a, two auxiliary arms 112a and one connector 113a. Two respective ends of the two principal arms 111a are respectively mounted on two opposite sides of the vehicle body 20 and the principal arm 111a can rotate relative to the vehicle body 20. The other end of the principal arm 111a is hingedly connected to a side surface of the connector 113a. Two respective ends of the two auxiliary arms 112a are respectively hingedly connected to two ends of the connector 113a. The other end of each auxiliary arm 112a is fixedly connected to one driving apparatus 12a and the auxiliary arm 112a can rotate relative to the principal arm 111a to implement folding. A limiting structure and an elastic part are disposed at a joint between the principal arm 111a and the vehicle body 20 and the elastic part can improve the operational convenience and the hand feel. A limiting structure and an elastic part are disposed at a joint between the principal arm 111a and the auxiliary arm 112a. In some other embodiments, a structure such as a spring lock may be used for locking.

It may be understood that, in some other embodiments, a spring lock is disposed at a joint between the principal arm 111a and the vehicle body 20a.

It may be understood that, the connector 113a may be omitted. Instead, one end of the auxiliary arm 112a is directly hingedly connected to the principal arm 111a and one end of the other auxiliary arm 112a is hingedly connected to the one end of the auxiliary arm 112a.

The four propellers are respectively mounted on the four driving apparatuses 12a. The lengths of the four auxiliary arms 112a are equal and the lengths of two auxiliary arms 112a are roughly equal to the length of the principal arm 111a. Cross-sectional shapes of the principal arm 111a and the auxiliary arms 112a are rectangular.

It may be understood that, cross-sectional shapes of the principal arm 111a and the auxiliary arms 112a are not limited to being rectangular and may be set according to an actual requirement to, for example, rectangles, triangles, or other irregular shapes.

During flight, the arms 11a are in an unfolded state and the principal arm 111a is perpendicular to a heading direction of the unmanned aerial vehicle 200. Two auxiliary arms 112a are located on one side of the vehicle body 20 and the other two auxiliary arms 112a are located on the other side of the vehicle body 20. Two auxiliary arms 112a located on a same side are located on a same straight line and are perpendicular to the principal arm 111a. It may be understood that, in some other embodiments, two auxiliary arms 112a located on a same side may be further set according to an actual requirement. For example, two auxiliary arms 112a located on a same side form a first included angle. The first included angle may be an obtuse angle or an acute angle. The auxiliary arms 112a and the principal arm 111a form a second included angle. The second included angle may be an obtuse angle or an acute angle.

After the flight ends, first, one of two auxiliary arms 112a located on a same side is rotated and the other auxiliary arm 112a remains stationary, so that the two auxiliary arms 112a located on the same side overlap each other. Then, the principal arm 111a is rotated by 90 degrees relative to the vehicle body 20. Finally, the connector 113a is rotated, so that the two auxiliary arms 112a located on the same side overlap the principal arm 111a. Based on the foregoing structure design, after being folded, the entire unmanned aerial vehicle 200 becomes very compact in structure and easy to carry. In addition, the unmanned aerial vehicle 200 can be effectively prevented from being damaged due to a collision when carried.

It may be understood that, in some other embodiments, for two auxiliary arms 112a located on a same side (that is, two auxiliary arms on a same arm), one end of one auxiliary arm 112a is hingedly connected to the connector 113a and one end of the other auxiliary arm 112a is fixedly connected to the connector 113a. When the unmanned aerial vehicle 200 flies, two auxiliary arms 112a located on a same side are located on a same straight line and are perpendicular to the principal arm 111a. After the flight ends, the auxiliary arm 112a hingedly connected to the principal arm 111a is rotated by 180 degrees, so that the two auxiliary arms 112a located on the same side overlap each other. Then, the principal arm 111a is rotated by 90 degrees relative to the vehicle body 20. Finally, the connector 113a is rotated, so that the two auxiliary arms 112a located on the same side overlap the principal arm 111a. Based on the foregoing structure design, after being folded, the entire unmanned aerial vehicle 200 becomes very compact in structure and easy to carry. In addition, the unmanned aerial vehicle 200 can be effectively prevented from being damaged due to a collision when carried.

In the foregoing embodiments, a hinge connection (that is, a hinge joint) is only an example of a connection manner. It may be understood that, in another embodiment, the hinged connection may be further replaced with another non-rigid connection, provided that the auxiliary arm (112, 112a) can rotate relative to the principal arm (111, 111a) to implement folding. This is no strictly limited herein.

Finally, it should be noted that, the foregoing embodiments are used only for describing the technical solutions of the present invention, but not for limiting the technical solutions. According to the idea of the present invention, technical features in the foregoing embodiments or different embodiments may be combined, steps may be performed in any sequence and there are many other variations described above in different aspects of the present invention. For brevity, they are not provided in detail. Although the present invention is described in detail by referring to the foregoing embodiments, a person of ordinary skill in the art should understand that, the person still may modify the technical solutions recorded in the foregoing embodiments, or equivalently replace some technical features thereof. These modifications or replacements do not make the nature of the corresponding technical solutions depart from the scope of the technical solutions of the embodiments of the present invention.

What is claimed is:

1. An arm, applied to an unmanned aerial vehicle, wherein the unmanned aerial vehicle comprises a vehicle body and the arm comprising:
    a principal vehicle arm, wherein the principal arm is mounted on the vehicle body and the principal arm is rotatable relative to the vehicle body; and
    an auxiliary arm, wherein one end of the auxiliary arm is connected to the principal arm and the auxiliary arm is rotatable relative to the principal arm;
    wherein the number of the arms is two and each arm comprises one principal arm, two auxiliary arms and one connector, two respective ends of the two principal arms respectively mounted on two opposite sides of the vehicle body, the principal arms capable of rotating relative to the vehicle body and the other end of the principal arm hingedly connected to the connector;
    a plane on which tracks formed by rotating of each principal arm is perpendicular to a plane on which tracks formed by rotating of an auxiliary arm on the same side of the vehicle body.

2. The arm according to claim 1, wherein the other end of the auxiliary arm is used for mounting a driving apparatus.

3. The arm according to claim 1, wherein the two auxiliary arms are respectively connected to two ends of the connector; and when the arm is folded, the principal arm comes into contact with the vehicle body, one auxiliary arm overlaps the other auxiliary arm and the two auxiliary arms overlap the principal arm after the one auxiliary arm rotating by 180 degrees.

4. The arm according to claim 1, wherein for two auxiliary arms located on a same side, one end of one auxiliary arm is hingedly connected to the connector and one end of the other auxiliary arm is fixedly connected to the connector.

5. The arm according to claim 4, wherein when the arm is unfolded, two auxiliary arms located on a same side are located on a same straight line and are perpendicular to the principal arm.

6. An unmanned aerial vehicle, comprising:
a vehicle body;
an arm, wherein the arm is connected to the principal arm;
a driving apparatus, wherein the driving apparatus is mounted on the auxiliary arm; and
a propeller, wherein the propeller is mounted on the driving apparatus, driven by the driving apparatus to generate a lift force or a propulsive force, wherein
the arm comprises:
a principal vehicle arm, wherein the principal arm is mounted on the vehicle body and the principal arm is rotatable relative to the vehicle body; and
an auxiliary arm, wherein one end of the auxiliary arm is connected to the principal arm and the auxiliary arm is rotatable relative to the principal arm;
wherein the number of the arms is two and each arm comprises one principal arm, two auxiliary arms and one connector, two respective ends of the two principal arms respectively mounted on two opposite sides of the vehicle body, the principal arms capable of rotating relative to the vehicle body and the other end of the principal arm hingedly connected to the connector;
a plane on which tracks formed by rotating of each principal arm is perpendicular to a plane on which tracks formed by rotating of an auxiliary arm on the same side of the vehicle body.

7. The unmanned aerial vehicle according to claim 6, wherein the other end of the auxiliary arm is used for mounting a driving apparatus.

8. The unmanned aerial vehicle according to claim 6, wherein the two auxiliary arms are respectively connected to two ends of the connector; and when the arm is folded, the principal arm comes into contact with the vehicle body, one auxiliary arm overlaps the other auxiliary arm after rotating by 180 degrees and the two auxiliary arms overlap the principal arm.

9. The unmanned aerial vehicle according to claim 6, wherein for two auxiliary arms located on a same side, one end of one auxiliary arm is hingedly connected to the connector and one end of the other auxiliary arm is fixedly connected to the connector.

10. The unmanned aerial vehicle according to claim 9, wherein when the arm is unfolded, two auxiliary arms located on a same side are located on a same straight line and are perpendicular to the principal arm.

* * * * *